United States Patent [19]
Honda et al.

[11] 3,884,85
[45] May 20, 197

[54] ADHESIVE COMPOSITION FOR ADHESION BETWEEN FABRIC MATERIAL AND RUBBER AND A PROCESS FOR PREPARATION THEREOF

[75] Inventors: Toshio Honda; Takehiro Ueki; Yukio Fukuura, all of Tokyo, Japan

[73] Assignee: Bridgestone Tire Co., Ltd., Tokyo, Japan

[22] Filed: Oct. 18, 1972

[21] Appl. No.: 298,584

[30] Foreign Application Priority Data
Oct. 26, 1971  Japan................. 46-84373

[52] U.S. Cl. ......... 260/29.3; 117/138.8 N; 156/335; 260/57 R; 260/845; 260/846
[51] Int. Cl............................................... C08g 51/24
[58] Field of Search......... 260/29.3, 845, 846, 57 C, 260/57 R; 156/335; 117/138.8 N

[56] References Cited
UNITED STATES PATENTS

| | | | |
|---|---|---|---|
| 2,609,352 | 9/1952 | Kvalnes............................. | 260/57 R |
| 2,940,954 | 6/1960 | Barr................................... | 260/2 |
| 2,961,343 | 11/1960 | Atwell................................ | 260/2 |
| 3,091,560 | 5/1963 | Miller et al. ..................... | 156/3 |
| 3,338,769 | 8/1967 | Kuhlkamp et al. ................ | 260/2 |
| 3,437,122 | 4/1969 | Van Giles........................... | 260/2 |
| 3,480,066 | 11/1969 | Meredith .......................... | 156/3 |

*Primary Examiner*—Lorenzo B. Hayes
*Attorney, Agent, or Firm*—Fitzpatrick, Cella, Harper & Scinto

[57] ABSTRACT

An adhesive composition for adhesion between fabric material and rubber is produced by a process in which a monohydric phenol is reacted with an aldehyde the presence of an alkali metal hydroxide as a catalyst and neutralized with an acid; the resulting resino material is dissolved in dilute ammonium hydroxide the absence of free aldehyde and then mixed with rubber latex.

3 Claims, No Drawings

ADHESIVE COMPOSITION FOR ADHESION BETWEEN FABRIC MATERIAL AND RUBBER AND A PROCESS FOR PREPARATION THEREOF

BACKGROUND OF THE INVENTION

1. Field of the Invention

The present invention relates to a novel adhesive composition used for adhering rubber to fabric material and a process for preparing said composition.

2. Description of the Prior Art

When fabric materials such as nylon, vinylon, rayon, or polyester synthetic fibers are used as a reinforcing member for rubber articles such as pneumatic tires, belts, air cushions, hoses, or rubber vibration insulators, it is necessary to firmly adhere rubber compounds to these synthetic fabric materials. The adhesive composition used for treating a large quantity of fabric materials is preferably non-inflammable and non-poisonous. From the above point of view, it is convenient and economical to use water as the medium for an adhesive composition. It is also desirable that the adhesive composition be durable and have a long shelf life.

As the conventional adhesive composition for this purpose, there may be mentioned a mixture of a rubber latex and a condensed product obtained by the reaction of resorcinol with an aldehyde, particularly formaldehyde, in the presence of a catalyst such as an alkaline material or acid material (generally called "RFL").

This RFL has been and is now widely used as an adhesive liquid suitable for mass production.

The amount of consumption of synthetic rubbers, particularly styrene-butadiene copolymer (SBR) has increased year by year. SBR is generally mixed with natural rubber (NR), but the compounding rate of SBR tends to increase with the progress of rubber processing techniques and, furthermore, compositions consisting of SBR alone are now increasing.

When a blended composition of SBR and NR or a composition of NR alone is reinforced by a synthetic fabric material, a synthetic fabric material treated with RFL, which is believed to be ideal, is very effective for reinforcing a composition of NR alone and a blended composition of SBR and NR containing a high ratio of NR. When said synthetic fabric material is treated by RFL, however, it is not so effective for reinforcing a blended composition of SBR and NR containing a high ratio of SBR because the adhesive strength between the synthetic fabric material and the blended composition of SBR and NR containing a high ratio of SBR is low. Since such a low adhesive strength results in the shortening of the life of a rubber product subjected to a large, periodic deformation, it is desirable to prepare an adhesive composition having improved adhesive strength between SBR and a synthetic fabric material.

In a conventional process for producing RFL, resorcinol and formaldehyde are reacted in a solvent such as water in the presence of an alkaline catalyst and then latex is added after the reaction product reaches a certain degree of condensation. In general, excess, preferably 1.25-2.5 moles, of formaldehyde is added to 1 mole of resorcinol. As the alkaline catalyst, there are used alkali metal hydroxides such as sodium hydroxide and potassium hydroxide or weak bases such as amines and, particularly, ammonium hydroxide; the resulting condensation product of resorcinol with formaldehyde belongs to the resol type.

Another conventional process for producing RFL as follows: Formaldehyde and resorcinol, wherein less than an equimole of resorcinol is employed, are reacted in the presence of an acidic catalyst such as p-toluene sulfonic acid and the like to produce a novolac type resin. The solution containing the resin is made alkaline by adding an alkaline material such as caustic soda just before use; formaldehyde is added until the quantity (mole) of formaldehyde becomes equal to, or greater than, that of resorcinol, and then rubber latex is added.

SUMMARY OF THE INVENTION

According to the present invention, there is provided a process for the production of an adhesive composition for adhesion between fabric material and rubber characterized in that a monohydric phenol is reacted with an aldehyde in the presence of an alkali metal hydroxide as a catalyst, the mixture is dissolved in dilute ammonium hydroxide in the absence of free aldehyde and then mixed with a rubber latex.

According to another aspect of the present invention, there is provided an adhesive composition for adhesion between fabric material and rubber prepared by the process as described above. An object of this invention is to provide a process for producing an adhesive composition giving good adhesion between fabric material and a blended composition of synthetic rubber and natural rubber containing a high percentage of synthetic rubber or a composition of synthetic rubber alone. Another object of this invention is to provide an adhesive composition capable of being used just after production without storing or aging.

A further object is to provide a durable adhesive composition.

DESCRIPTION OF THE PREFERRED EMBODIMENTS

The process of this invention is as follows.

A monohydric phenol and aldehyde are reacted in a solvent such as water and organic solvent, for example, alcohols, ketones, esters, and aromatic hydrocarbon in the presence of an alkali metal hydroxide such as sodium hydroxide, potassium hydroxide, and the like, and then an acidic material such as an organic acid, for example, acetic acid, formic acid, propionic acid, chloroacetic acid, glyoxylic acid, benzene sulfonic acid, p-toluene sulfonic acid, and an inorganic acid, for example, hydrochloric acid, carbonic acid, sulfuric acid, boric acid, nitric acid, and phosphonic acid, is added to separate the resulting resin. The thus separated resin is dissolved in an aqueous solution of ammonium hydroxide, or an amine compound having low boiling point, for example, methyl amine, dimethyl amine, trimethyl amine, ethyl amine, diethyl amine, triethyl amine, n-propyl amine, n-butyl amine, n-amyl amine and the like, in the absence of free aldehyde, and thereafter rubber latex is added to prepare a liquid adhesive.

It has been now found that the adhesive composition produced by the above described process has excellent adhesive properties for rubber compounds containing a high ratio of SBR. The adhesive composition has, of course, good adhesion to the NR compounds.

An important point in the process of the present invention is to produce the resol type resin by using an alkali metal hydroxide as a catalyst by reaction between the monohydric phenol and the aldehyde at first (An acidic material should not be used because a novolac type resin is produced thereby.). Ammonium hydroxide or basic organic compounds such as amines should not be used as the alkaline catalyst in the present invention. When amines are used as catalysts, a complicated reaction occurs between the amines and the free aldehyde produced during the reaction; in addition, the amine will react with a phenol to produce a long chain, water insoluble resin.

It is also important that free aldehyde should not be present when the separated resinous material is dissolved in ammonium hydroxide. When free aldehyde is present, a long chain, water insoluble resin is produced as mentioned above. This is not desirable.

Representative monohydric phenols which may be used in the present invention are phenol, and alkyl phenols such as cresol, ethyl phenol, xylenol and the like; the preferred phenols are phenol, m-cresol and p-cresol, with phenol being particularly preferred.

It was believed that resorcinol is a most preferred phenol for adhesives since synthetic fibers were used as a reinforcing element. Accordingly, it is not too much to say that the only phenols being used at present are resorcinols. On the other hand, it was not known that good results could be obtained through the use of inexpensive and easily available phenol as a component of an adhesive composition. For example, D. M. Sandomirskii et al. reported that adhesive compositions prepared from phenol were inferior to those prepared from resorcinol. (Refer to M. S. Dostyan, D. M. Sandomirskii and P. V. Vaina: *Soviet Rubber Technology* Vol. 19, No. 9, Page 20-Page 25.).

The effect of formaldehyde resins prepared with resorcinol and phenol has been described in the art. The reaction between phenol and resorcinol with formaldehyde in the preparation of an adhesive solution is depicted by the following reaction sequence:

As indicated by the above reaction sequence, the resulting products are

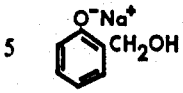   in the case of phenol and

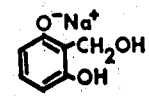   in the case of resorcinol.

A composition containing a free hydroxyl group linked directly to the benzene nucleus exhibits good adhesive properties. The product having no free hydroxyl group linked directly to a benzene nucleus and having an -O⁻Na⁺ group resulting from the hydroxyl group present in the original compounds exhibits only poor adhesive properties. Accordingly, it has been believed, prior to the present invention, that an adhesive prepared from resorcinol and formaldehyde is a very good adhesive, which the adhesive prepared from phenol and formaldehyde was believed to be inferior to the product prepared from resorcinol. Phenol-formaldehyde resin in the latex was believed to cause no noticeable increase in the bond strength of model systems, the mechanical properties of the films or the bond strength of the system as a whole. Resorcinol-formaldehyde resin, on the other hand, was believed to improve the properties of model systems substantially and increase bond strength in the cord-adhesive-rubber system. (c.f. *Soviet Rubber Technology* Vol. 19, No. 9, pp. 20–25 (1960)).

By the present invention, an excellent adhesive is provided using, phenol in place of resorcinol. The reaction proceeds according to the following sequence:

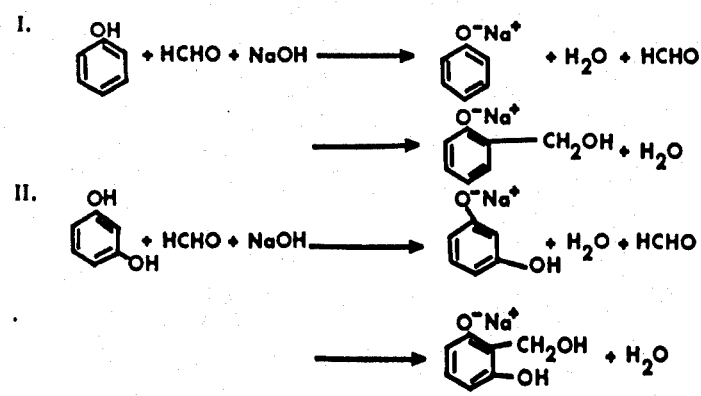

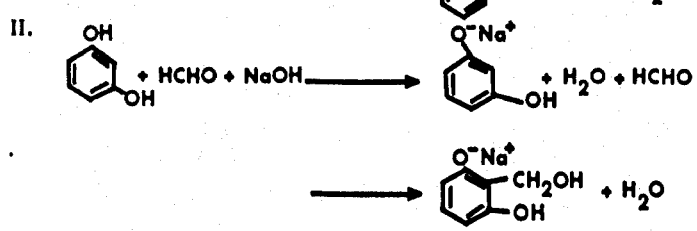

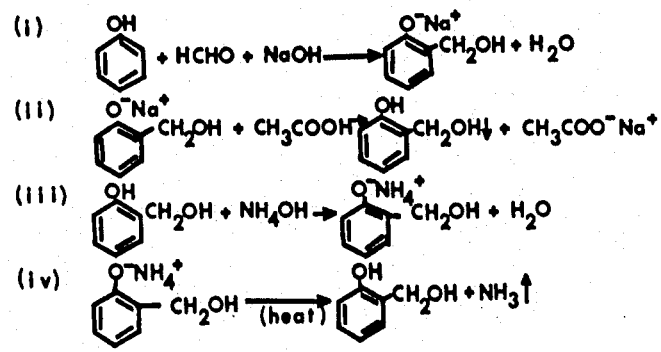

In the reaction sequence, reaction (iv) illustrates the reaction which occurs in the treatment of a fabric material. The reaction products obtained in (i), and (iii) are water soluble, and (ii) is water insoluble. (ii) is removed by filtering. It is desirable that the components of the adhesive be soluble in water since water is the medium generally employed for adhesives. It is preferred that the resin contains a free —OH group linked directly to the benzene nucleus after the heating treatment. This is accomplished by the present invention by converting the —O$^-$NH$_4^+$ group to an —OH group with heating. This heat conversion to an —O$^-$NH$_4^+$ group is not possible where the resin contains an —O$^-$Na$^+$ group. The use of NH$_4$OH in place of NaOH in (i) does not result in the preparation of the ammonium salt of phenol as would be expected. When ammonia is employed in place of NaOH, a white precipitate is formed. This precipitate has very complicated structure, and its typical structure is represented by the following formula:

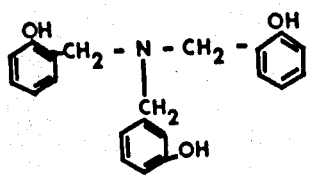

The above mentioned formulas I, II, (i), (ii), (iii) and (iv) are reaction sequences simplified in order to understand easily the difference of behavior between NaOH and NH$_4$OH and the process of the present invention. In fact the above reactions are more complicated. Furthermore, formaldehyde attacks H radical at para position of phenol.

The present inventors have found that an adhesive composition capable of giving high adhesion strength can be produced by using monohydric phenols such as phenol and the like.

One of the features of the present invention is that the adhesive composition of the present invention gives high adhesion strength between a fabric material and blended compositions of SBR and NR containing a high ratio of SBR, or a composition of SBR alone as well as a composition of NR alone.

The aldehyde used in the present invention is a compound having an aldehyde radical and reactivity with phenols. Aldehydes such as furfural, acrolein and the like may be employed, but formaldehyde is the most preferred aldehyde. Further, there may be used aldehyde polymers such as para formaldehyde, alpha polyoxymethylene, beta polyoxymethylene, polyoxymethylene glycol derivative, trioxane, tetraoxane and the like.

In the present invention, the reaction temperature of the reaction between the phenol and the aldehyde in the presence of the alkali metal hydroxide is preferably from 30°C. to 100°C. at ordinary pressure; the preferred temperature range is from 70°C. to 95°C. The reaction time is determined appropriately depending upon temperature, the amount of catalyst, and the like. For example, where a reaction temperature of 80°C. is employed, it is preferable to employ sufficient catalyst so that the reaction time is from about 1 hour to 3 hours. The amount of alkali metal hydroxide used as catalyst is suitably from 0.01 mole to 0.02 moles per mole of phenol; the preferred amount is from 0.05 moles to 0.15 moles.

The ratio of aldehyde to phenol is important; t[he] amount of aldehyde is suitably from about 4 moles 10 moles. The preferred ratio is from about 4 moles 10 moles per 1 mole of phenol.

The progress of the reaction can be determined [by] the change of the average molecular weight and the d[is]tribution curve of the molecular weight. The avera[ge] molecular weight of the reaction product is suitab[ly] from 200 to 2,500, and preferably, from 500 to 1,50[0].

After the reaction is complete, the resin thus pr[o]duced can be separated by adding dropwise an organ[ic] acid such as acetic acid or an inorganic acid such as h[y]drochloric acid or by pouring the reaction product in[to] the acid.

The material thus separated is filtered, washed, dri[ed] in air or dried under reduced pressure to obtain a resi[n]ous material useful for adhesion. If the material th[us] separated is dissolved in an organic solvent having [a] low boiling point such as acetone at the wet stage b[e]fore drying and then is evaporated and dried under [re]duced pressure, the resinous material is obtained mo[re] rapidly.

When free aldehyde remains in the resinous materi[al] formaldehyde is generated, and in practical use of t[he] resinous material, it is harmful to the human body; f[ur]thermore, it causes insolubility of the resinous mater[ial] in ammonium hydroxide in the later process. The pr[ob]lem is prevented by employing the separation step.

The upper limit of the amount of aldehyde in t[he] composition is not set but, from an economical point [of] view, it is preferable that the upper limit of the amo[unt] of aldehyde in the composition be about 10 moles [per] 1 mole of phenol.

The above resinous material can be easily dissolv[ed] in dilute aqueous solution of ammonium hydroxi[de]. When the molecular weight of the resinous materia[l is] large, the amount of ammonium hydroxide may be [in]creased.

The adhesive solution is prepared by mixing rubb[er] latex with the above-mentioned ammoniacal soluti[on]. Natural rubber latex or various synthetic rubber lati[ces] are contained in the rubber latex employed in the pr[es]ent invention. In particular, vinylpyridine styrene bu[ta]diene terpolymer latex, styrene-butadiene copolyr[ner] latex, polybutadiene latex and the like may be us[ed]. Polychloroprene latex, acrylonitrile-acrylic butadi[ene] copolymer latex, acrylonitrile-acrylic-butadiene [ter]polymer latex, acrylonitrilalkyl m-acrylate butadi[ene] terpolymer latex isoprene isobutylene copolymer lat[ex] halogenated isoprene isobutylene copolymer latex, e[th]ylene propylene non-conjugated diene terpolymer [la]tex, chlorinated polyethylene latex, chlorosulfona[ted] polyethylene latex, and the like, may be used. The r[ub]ber latices may be used alone or mixtures of two [or] more may be employed.

The concentration of the solid portion of the ad[he]sive composition is from about 1 to 50%, but is pref[era]bly from about 15 to 25%. The amount of the resin[ous] material is from about 2 parts to 50 parts, per 100 p[arts] of the solid of the rubber latex, preferably from ab[out] 10 parts to 40 parts, and most preferably, from ab[out] 20 parts to 35 parts.

A synthetic fabric material is coated with the a[dhe]sive solution by dipping or spraying and then dried. [The] drying temperature may be from about 100°C. [to a] temperature about 5°C. lower than the melting poi[nt of] the fabric material employed. A temperature as hig[h]

possible is generally employed since this will shorten the treating time.

The amount of the adhesive composition attached to a fabric material is from about 1 part to 15 parts per 100 parts of fabric material, preferably from 3 parts to 8 parts. The amount thus attached can be controlled by the concentration of the adhesive composition.

The advantage of the adhesive composition of the present invention is that the adhesive composition can be put in practical use just after being produced by dissolving the resinous material in dilute ammonium hydroxide and mixing with rubber latex. Even if the adhesive composition is allowed to stand for more than one month after being produced, the adhesive strength is not decreased. On the contrary, a conventional RFL can not be put into practical use unless RFL stands and ages for sixteen hours after being produced, and can not be used for as long a period as the adhesive composition of the present invention.

The resinous material is easily dissolved in ammonium hydroxide and a transparent solution is obtained. If the resinous material is dissolved in ammonium hydroxide in the presence of free aldehyde, the resinous material will react with the free aldehyde to produce a white precipitate which is not soluble in water. In the present invention, the resinous material is dissolved in ammonium hydroxide in the absence of free aldehyde. The process of the present invention is remarkably different from the conventional process in the above point.

EXAMPLE 1

One hundred parts (1.1 moles) of phenol, 440 parts (5.4 moles) of 37% formalin and 20 parts (0.12 moles) of 6N caustic soda were reacted with stirring together in a flask fixed with a reflux condenser at 80°C. for 1.5 hours. The solution was then cooled and neutralized with 6N acetic acid and a precipate settled out of solution.

The precipitate was collected by a centrifugal separator, dissolved in 500 parts of acetone, evaporated and dried under reduced pressure, and crushed to a power of resinous material. Forty parts of said resinous material was dissolved in dilute ammonium hydroxide (50 parts of 28% ammonium hydroxide was diluted with 550 parts of water) to obtain a uniform, clear solution. The resulting solution was mixed with 400 parts of 40% vinylpyridine styrene butadiene terpolymer latex (JSR 0650, manufactured by Japan Synthetic Rubber Co.), stirred sufficiently and immediately put in practical use as an adhesive solution.

The 6-Nylon cord of 1260 D/2 was dipped in the adhesive solution and was dried at 190°C. for 5 minutes. The rubber compositions A and B were prepared as shown in Table 1. Composition A is a blended rubber composition of NR and SBR containing a high ratio of NR, and composition B is a blended rubber composition containing high ratio of SBR.

Table 1

| Composition | Rubber Composition | |
|---|---|---|
| | A | B |
| NR | 80 | 20 |
| SBR | 20 | 80 |
| Carbon black | 40 | 40 |
| Softner | 10 | 10 |
| Stearic acid | 2 | 2 |
| N-phenyl-$\beta$-Naphthylamine | 1.5 | 1.5 |
| 2-benzothiazolyl disulfide | 0.75 | 0.75 |
| diphenyl guanidine | 0.75 | 0.75 |
| Sulfur | 2.5 | 2.5 |
| Adhesion strength between the cord treated with the adhesive solution of the present invention Kg/cord | 2.8 | 2.5 |

The adhesive strength was measured as follows. The treated cords were set near the surface of the unvulcanized rubber composition sheet and were vulcanized under a pressure of 30kg/cm$^2$ at 150°C. for 20 minutes. One cord was separated from said vulcanized rubber sheet at the speed of 30cm/min. to measure separation resistance. The separation resistance per one cord was designated as the adhesive strength.

Comparison Example

Conventional RFL was tested and the following results were obtained:

RFL was produced as follows:

Eleven parts (0.1 mole) of resorcinol was dissolved in 519 parts of water; 16.2 parts (0.2 moles) of 37% formalin was added thereto. 10 parts (0.025 mole) of 10% aqueous solution of caustic soda was added immediately, the mixture was allowed to stand for four hours; 244 parts of 40% vinylpyridine styrene butadiene terpolymer latex (JSR 0650, manufactured by Japan Synthetic Rubber Co.) was added, and thereafter, the mixture was aged for sixteen hours.

The preparation of test pieces and test were carried out by the same process as in Example 1. The test results are as shown in Table 2. The rubber compositions A and B were the same as those of Example 1.

Table 2

| Rubber composition | A | B |
|---|---|---|
| Adhesive strength (kg/cord) | 2.6 | 1.3 |

From Table 1 and Table 2, it is found that the adhesive composition of the present invention is not different from RFL for the rubber composition containing a low ratio of SBR, but is remarkably better than RFL for the rubber composition containing high rate of SBR.

EXAMPLE 2 m-cresol was used in place of phenol in Example 1. The result was as shown in Table 3.

Table 3

| Rubber composition | A | B |
|---|---|---|
| Adhesive strength (kg/cord) | 2.3 | 2.0 | m-cresol is as good an adhesive as phenol.

What is claimed is:

1. In a process for making a synthetic fabric-to-rubber adhesive having improved stability and improved adhesion for bonding synthetic fabric and natural rubber, styrene-butadiene copolymer and high ratio blends of styrene-butadiene-natural rubber copolymers comprising mixing a synethic rubber latex with an aqueous, alkaline, aldehyde-free resole solution; the improvement comprising preparing said resole by reacting one mole of a monohydric phenol selected fro: phenol and an alkyl phenol with from about 4–10 mol of formaldehyde or an aldehyde polymer, in a solven employing an alkali metal hydroxide catalyst at a ten perature from about 30°–100°C. to form a resole res having a molecular weight from about 200 to 250 separating said resole resin by neutralizing the reactic mixture with an acid drying and; dissolving the sep rated resin in dilute ammoniacal solution free of ald hyde and thereafter mixing the resulting solution wi the rubber latex in the weight ratio of 2–50 parts res per 100 parts rubber latex solids.

2. The process of claim 1 including employing fro about 10–40 parts of resole resin per 100 parts rubb latex solids.

3. The synthetic fabric-to-rubber adhesive produ prepared by the process of claim 1.

* * * * *